(No Model.)

G. F. SIMONDS.
BALL BEARING.

No. 466,443. Patented Jan. 5, 1892.

Witnesses:
Robert Emmett,
J. A. Rutherford

Inventor:
George F. Simonds.
By James L. Norris,
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 466,443, dated January 5, 1892.

Application filed October 8, 1891. Serial No. 408,156. (No model.)

*To all whom it may concern:*

Be it known that I, GEORGE F. SIMONDS, a citizen of the United States, residing at Fitchburg, in the county of Worcester and State of Massachusetts, have invented new and useful Improvements in Ball-Bearings, of which the following is a specification.

My invention relates to anti-friction bearings for sustaining radial pressure or weight and resisting thrust or end pressure; and it consists in a bevel-cage constructed to receive an annular series or circular group of spherical rollers or balls that are adapted to revolve freely in all directions and independently of each other, said balls being arranged to project through circular openings in the opposite walls of the bevel-cage in such position as to bear against and roll on the beveled bearing-surfaces of a rotary and non-rotary part, as in the hubs of bicycle-wheels and other situations, and sustain and resist both radial pressure and end-thrust.

The invention also consists in the construction, arrangement, and combination of parts in a ball-bearing, as hereinafter more particularly described and claimed.

Figure 1:
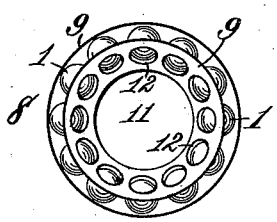
Figure 2:
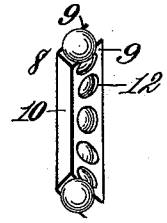
Figure 3:
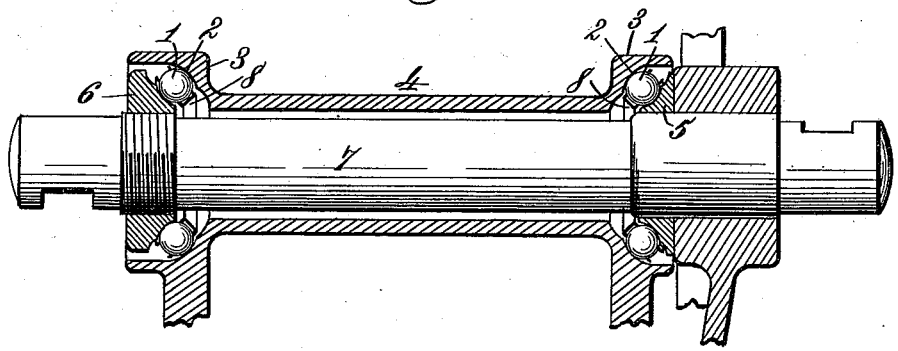
Figure 4:
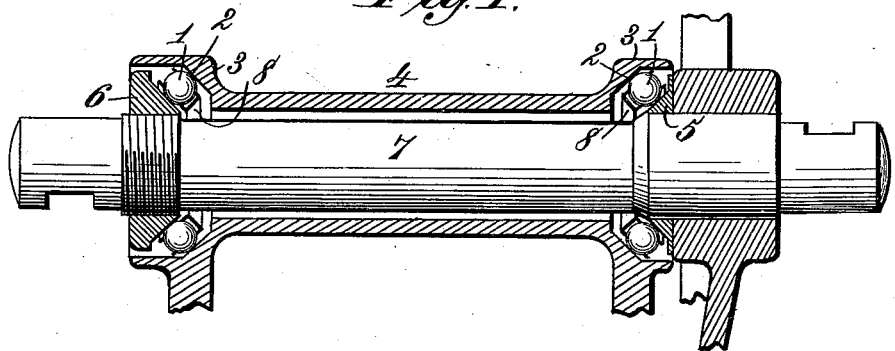

In the annexed drawings, illustrating the invention, Figure 1 is a plan of my bevel-cage for receiving and retaining the spherical rollers or balls of a ball-bearing. Fig. 2 is a transverse section of the same. Fig. 3 is a longitudinal section of a bicycle-bearing, showing cages and balls arranged in position to sustain radial pressure or weight and resist thrust or end pressure from both directions. Fig. 4 is a similar section, except that the bearing-surfaces on which the balls act are plane instead of grooved.

In bicycles as now constructed the anti-friction balls 1 are placed loosely and uncaged in annular outwardly flared or beveled channels 2, arranged between the enlarged end portions 3 of a box or casing 4 and the adjacent surfaces of a collar 5 and nut 6, that are fast on the axle 7, as shown in Fig. 3. The balls being loose or unconfined, save by the opposing surfaces of the box and nuts or collars, will unavoidably crowd each other when in action, especially at the lower parts of the bearing, toward which they have a tendency to gravitate. By this crowding of the balls and wedging action on each other the efficiency and durability of the bearing are greatly impaired, so that besides the large loss of power and speed the lack of uniformity in the action of the balls quickly results in unequal grinding and wear of the bearing-surfaces.

The above-mentioned difficulties and objections can be readily overcome by placing the balls or spherical rollers 1 in a suitable cage, which should be so constructed that while preventing the balls from crowding and grinding they will be free to revolve independently of each other and project from the cage in such positions as to roll freely in all directions upon and against the bearing-surfaces and take both radial pressure and end-thrust. As before referred to, the annular channel or channels 2, in which the balls are placed, have an outwardly-flared conformation with the adjacent beveled faces of the box 4 and collar 5 or nut 6, and it is necessary that the cage should have a similar configuration, not only for the purpose of enabling it to support the balls independently of each other and in position to sustain and resist both radial pressure and end-thrust, but also because by employing a cage of this shape it can be applied at once in bicycles having bearings of the present ordinary construction, in which the annular channels 2 are usually flared in the manner herein shown and described.

The annular beveled-shaped ball-retaining cage 8, Figs. 1 and 2, is preferably composed of sheet metal that may be spun or otherwise brought to the required shape, as shown. This cage 8 is formed with two parallel beveling walls or sides 9, that are connected at their inner edges by a cross-wall 10 at right angles with the two flaring side walls and forming the central opening 11, by which the cage is made to loosely surround a shaft or axle. In each of the flaring or beveling side walls 9 are formed an annular series of circular openings 12, that receive and retain the spherical rollers or balls 1 independently of each other and in position to project therefrom and roll freely in all directions upon and against the adjacent bearing-surfaces furnished by the beveled or flaring walls of the channel or channels 2, in which the balls revolve. By this construction all crowding and grinding of the anti-friction balls is effectually prevented, and each ball is adapted and permitted to revolve freely in all directions in contact with the beveled bearing-surfaces and in such position as to sustain and resist both radial pressure and end-thrust without injury to any part of the bearing.

In a ball-retaining cage of this construction the spherical rollers or balls can be readily inserted and removed by slightly springing the parallel beveling walls 9, and after the balls are placed in the cage they can be inserted into or removed from a bearing in a body with great convenience.

It is obvious that while the described bevel-cage or ball-retaining device is especially adapted for use in bicycle-bearings, it may also be applied with advantage in many other locations.

The bearing-surfaces on which the balls act may be slightly grooved, as shown in Fig. 3, or, as shown in Fig. 4, they may be perfectly plane.

What I claim as my invention is—

1. A bevel-shaped ball-bearing cage having parallel flaring or beveling sides and provided with an annular series of circular openings for receiving a circular group of spherical rollers or balls in position to revolve freely and independently of each other in contact with beveled bearing-surfaces for the purpose of sustaining and resisting radial pressure and end-thrust, substantially as described.

2. In a ball-bearing, the combination, with rotary and non-rotary parts having beveled bearing-surfaces, of an annular bevel-shaped cage having parallel flaring or beveling sides and provided with an annular series of circular openings and a circular group of spherical rollers or balls placed in said cage and projecting therefrom in position to revolve freely in all directions upon and against the beveled bearing-surfaces for the purpose of sustaining and resisting radial pressure and end-thrust, substantially as described.

3. In a ball-bearing, the combination, with rotary and non-rotary parts having beveled bearing-surfaces that form an annular flaring or beveling channel, of an annular bevel-shaped cage having parallel flaring or beveling side walls, each provided with an annular series of circular openings, and a circular group of spherical rollers or balls placed in said cage and projecting therefrom in position to revolve freely in all directions independently of each other upon and against the beveled bearing-surfaces of the said rotary and non-rotary parts for the purpose of sustaining and resisting radial pressure and end-thrust, substantially as described.

In testimony whereof I have hereunto set my hand and affixed my seal in presence of two subscribing witnesses.

GEORGE F. SIMONDS. [L. S.]

Witnesses:
HARRIS C. HARTWELL,
CHARLES P. BAKER.